US008873691B2

(12) United States Patent
Hulvey et al.

(10) Patent No.: US 8,873,691 B2
(45) Date of Patent: Oct. 28, 2014

(54) GENERATING CODES FOR SYNC WORDS TO AVOID CYCLIC COLLISION

(71) Applicant: Broadcom Corporation, Irvine, CA (US)

(72) Inventors: Robert William Hulvey, Redondo Beach, CA (US); Hyungjin Kim, Irvine, CA (US); Steven Deane Hall, Olivenhain, CA (US); Nicholas Michael Carbone, San Diego, CA (US); Siukai Mak, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/022,513

(22) Filed: Sep. 10, 2013

(65) Prior Publication Data

US 2014/0072083 A1    Mar. 13, 2014

Related U.S. Application Data

(60) Provisional application No. 61/698,783, filed on Sep. 10, 2012, provisional application No. 61/858,780, filed on Jul. 26, 2013.

(51) Int. Cl.
*H04L 7/00* (2006.01)
(52) U.S. Cl.
USPC .......................................................... 375/365
(58) Field of Classification Search
CPC ............................ H04L 1/0026; H04L 1/0054
USPC .......................................................... 375/365
See application file for complete search history.

(56) References Cited

U.S. PATENT DOCUMENTS

| 5,588,005 | A | * | 12/1996 | Ali et al. | 370/346 |
| 2003/0003867 | A1 | * | 1/2003 | Kawamura | 455/41 |
| 2003/0086485 | A1 | * | 5/2003 | Lin et al. | 375/219 |
| 2005/0078614 | A1 | * | 4/2005 | Haartsen | 370/260 |
| 2009/0213782 | A1 | * | 8/2009 | Yee et al. | 370/321 |
| 2012/0224530 | A1 | * | 9/2012 | Norair | 370/328 |
| 2012/0307676 | A1 | * | 12/2012 | Chan et al. | 370/252 |

OTHER PUBLICATIONS

Parker, et al., "The Generation of Finite Alphabet Codewords with no Mutual Cyclic Shift Equivalence", retrieved from <http://www.ii.uib.no/~matthew/cycamb.pdf>, 5 pages.

* cited by examiner

*Primary Examiner* — Juan A Torres
(74) *Attorney, Agent, or Firm* — McDermott Will & Emery LLP

(57) ABSTRACT

Disclosed are various embodiments for circuitry that generates a sync code for wireless transmission. The system generates a sync word according to an identifier of the transmitter, the sync word being unique under a cyclic shift of the sync word. The system inserts a plurality of instances of the sync word into a data stream. The system also transmits, via the transmitter, the data stream to a receiver, the receiver being operable to perform a sliding correlation operation on the sync word.

20 Claims, 5 Drawing Sheets

Case 1: (0, 0, 0)

Case 2: (2^t0, 0, 0)

Case 3: (0, 2^t1, 0)

Case 4: (0, 0, 2^t2*3^s2)

Case 5: (2^t0, 2^t1, 0)

Case 6: (2^t0, 0, 2^t2*3^s2)

Case 7: (0, 2^t1, 2^t2*3^s2)

Case 8: (2^t0, 2^t1, 2^t2*3^s2)

GENERATING CODES FOR SYNC WORDS TO AVOID CYCLIC COLLISION

CROSS-REFERENCE TO RELATED APPLICATIONS

The present application claims the benefit of and priority to U.S. Provisional patent application titled "Generating Codes for Sync Words to Avoid Cyclic Collision," having Ser. No. 61/698,783, filed Sep. 10, 2012, which is hereby incorporated by reference herein in its entirety for all purposes.

The present application further claims the benefit of and priority to U.S. Provisional patent application titled "Generating Codes for Sync Words to Avoid Cyclic Collision," having Ser. No. 61/858,780, filed Jul. 26, 2013, which is hereby incorporated by reference herein in its entirety for all purposes.

BACKGROUND

Wireless communication devices may communicate with each other over a wireless network according to a communication protocol. Wireless communication devices may be configured to be a slave device or a master device. The data transmitted from a slave device may include a "sync word" that identifies the slave device. A slave device may generate the sync word based on the slave device's identifier to a sync word by XOR'ing a pseudo-random code with a polynomial code generated from the slave device's identifier.

It may be the case that two or more slave devices transmit a respective sync code to the master device over the wireless network. In this case, it is possible that a collision occurs such that the two sync words are received by the master device with a collision error.

BRIEF DESCRIPTION OF THE DRAWINGS

Many aspects of the present disclosure can be better understood with reference to the following drawings. The components in the drawings are not necessarily drawn to scale, emphasis instead being placed upon clearly illustrating the principles of the disclosure. Moreover, in the drawings, like reference numerals designate corresponding parts throughout the several views.

FIG. 3B is a drawing representing an example of the functionality of a sync word generator of a slave device of the communication system of FIG. 1 according to various embodiments of the present disclosure.

DETAILED DESCRIPTION

The present disclosure relates to generating sync words that reduce or eliminate the risk of a cyclic collision error. A wireless communication device may transmit a "sync word" that allows a master device to identify the wireless communication device. However, if two different wireless communication devices transmit their own sync words to the same master device at a similar point in time, then a cyclic collision may occur. A cyclic collision may result when one sync word is a cyclically shifted version of another sync word. Various embodiments of the present disclosure are directed to generating sync words based on a device identifier such that the generated sync word is unique under a cyclic shift of the generated sync word. Such sync words reduce or eliminate the risk of a cyclic collision at the master device.

According to various embodiments, the Chinese Remainder Theorem (CRT) is used a basis for generating sync words according to a device identifier. Through the use of the CRT, a one-to-one bijective mapping is achieved to assign sync words to wireless communication devices. In the following discussion, a general description of the system and its components is provided, followed by a discussion of the operation of the same.

Figure 1:
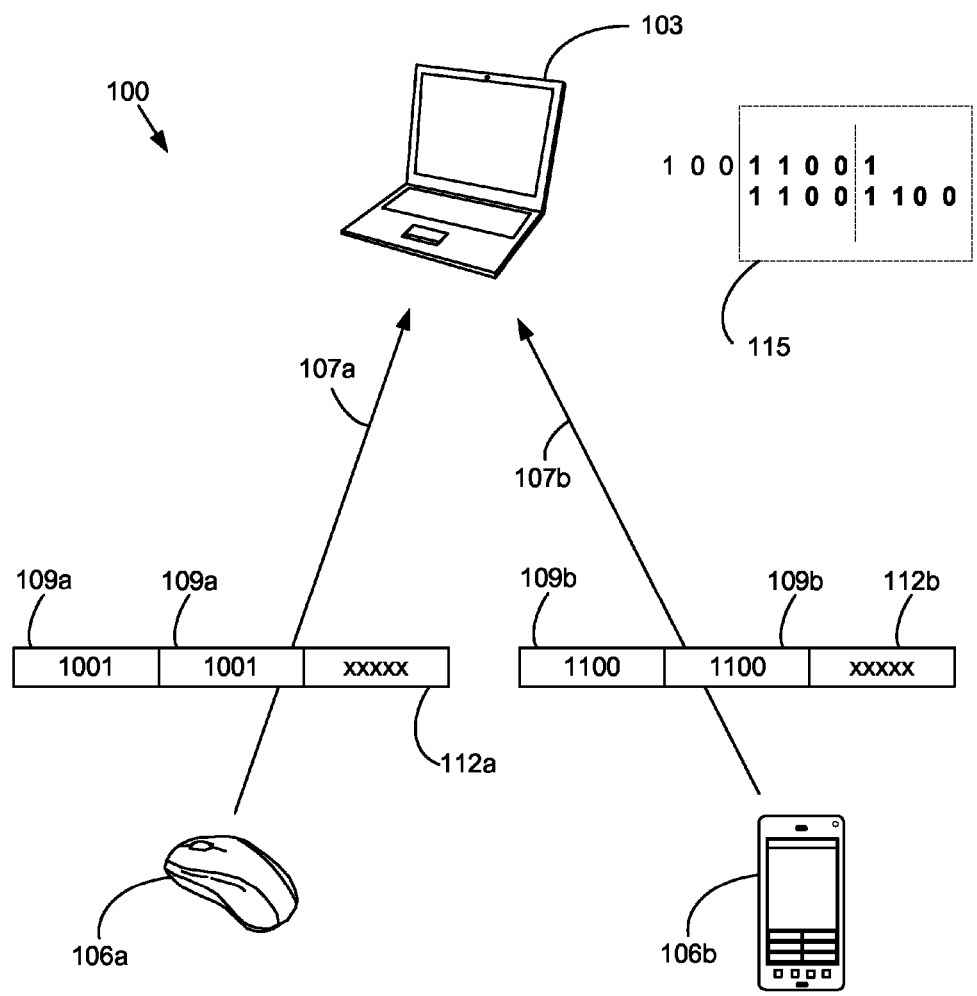
FIG. 1 is a drawing of an example of a communication system according to various embodiments of the present disclosure.

With reference to FIG. 1, shown is an example of a communication system 100, according to various embodiments of the present disclosure. The communication system 100 comprises a wireless network where multiple wireless communication devices may communicate with one another. These wireless communication devices may communicate according to a wireless communication protocol. The wireless communication protocol may be, for example, a mesh network protocol, a WiFi protocol, a Bluetooth protocol, a personal area network protocol, or any other wireless communication protocol.

The communication system 100 includes a wireless communication device that is configured to be a master device 103. The master device may be, for example, a computer system embodied in the form of a desktop computer, a laptop computer, a personal digital assistant, a cellular telephone, a smartphone, a web pad, a tablet computer system, or other device with like capability. The communication system 100 also includes one or more slave devices 106. A slave device may be a peripheral device such as a wireless keyboard, wireless mouse, headset, microphone, etc. The slave device 106 may also be a computer system embodied in the form of a desktop computer, a laptop computer, a personal digital assistant, a cellular telephone, a smartphone, a web pad, a tablet computer system, or other device with like capability.

A slave device 106 may be operable to transmit a data stream 107 to another device in the communication system 100. The data stream 107 may be formatted with a data packet made up of one or more data fields. According to various embodiments, the data stream 107 may include one or more instances of a sync word 109. The sync word 109 may be repeated one or more times in the data stream 107. The sync word 109 may be transmitted back-to-back such that the data stream 107 includes two adjacent fields dedicated to include the sync word 109. The data stream 107 may also include other information 112 such as substantive data, a header, a preamble, control information, security information, and/or any other information.

The master device 103 is operable to receive the data streams 107 from one or more slave devices 106. It is possible that a cyclic collision 115 occurs when the master device 103 receives a first sync word 109a that is a cyclically shifted version of a second sync word 109b. Following is a general description of the operation of the various components of the communication system 100 as well as an explanation of how a cyclic collision 115 may occur.

Some communication systems 100 allow a slave device 106 to enter a reduced power mode state and then reconnect to a master device 103 when the slave device 106 is ready to transmit data. The slave device 106 may send a synchronization signal to the master device 103 over the wireless network. The synchronization signal may include a sync word 109 that uniquely identifies the slave device 106 that is transmitting data.

As shown in FIG. 1, a first slave device 106a transmits a first data stream 107a that includes a first sync word 109a. The master device 103 receives the data stream 107a. When receiving the data stream 107a, it may be the case that the master device 103 does not receive the leading one or more bits of the data stream 107a. For example, the first data stream 107a may be received asynchronously such that the first slave device 106a transmits the first data stream 107a without complying with a previously established transmission time slot. To address the situation where the master device 103 does not receive a few leading bits of the first sync word 109a, the data stream 107a may include one or more instances of the first sync word 109a. In the non-limiting example of FIG. 1, the first sync word 109a is a 4-bit value of "1001" and a combination of the two instances of the first sync word 109a is "10011001." The first slave device 106a transmits the first sync word 109a twice, as two 4-bit fields, and the master device 103 receives a portion of the two 4-bit fields.

As shown in the non-limiting example of FIG. 1, the leading three bits of the first data stream 107a are not received by the master device 103. However, in the present example, the master device 103 identifies a 4-bit sync word 109a from the first slave device and, accordingly, the master device 103 extracts the bits "1100" from the two instances of the first sync word 109a. In this respect, the master device 103 extracts the first 4 bits from the received sync word 109 in the case where the wireless communication protocol of the communication system 100 uses a 4-bit sync code.

Upon identifying the sync word 109 from the data stream 107, the master device 103 performs a sliding correlation operation, in which the master device 103 correlates the received sync word 109, y[n], with its own internally generated sync word, x[n]. Since the master device 103 does not know where the start of the sequence is, correlation is performed for all n, where 0<=n<=N−1, where N is the number of bits of the sync word 109.

A second slave device 106b may transmit a second data stream 107b at a similar point in time of the transmission of the first data stream 107a. Similar to the first data stream 107a, the second data stream 107b includes multiple instances of a second sync word 109b, where the second sync word 109b identifies the second slave device 106b. In the non-limiting example of FIG. 1, the second sync word 109b is a 4-bit value of "1100" and a combination of the two instances of the second sync word 109b is "11001100." As shown in FIG. 1, the master device 103 receives the first sync word 109a and the second sync word 109b at approximately the same time. However, the second sync word 109b is a cyclically shifted version of the first sync word 109a and a cyclic collision 115 occurs. As a result, the master device 103 is unable to accurately distinguish between the identities of the first slave device 106a and the second slave device 106b.

According to various embodiments, a slave device 106 is operable to generate a sync word 109 in a manner that reduces or otherwise eliminates the risk of cyclic collision 115. In this respect, the slave device 106 may be configured to avoid false detection or misidentification such that x[n]≠y[m+n] for all 1<=m<=N−1. Furthermore, a reduced number of bits may be used to generate sync words 109 that are unique under cyclic shift. For example, according to various embodiments, a 32-bit sync word is generated based on a slave device's 24-bit identifier. By using a sync word 109 with fewer bits, an energy savings may be realized in low power transmission applications.

Figure 2:
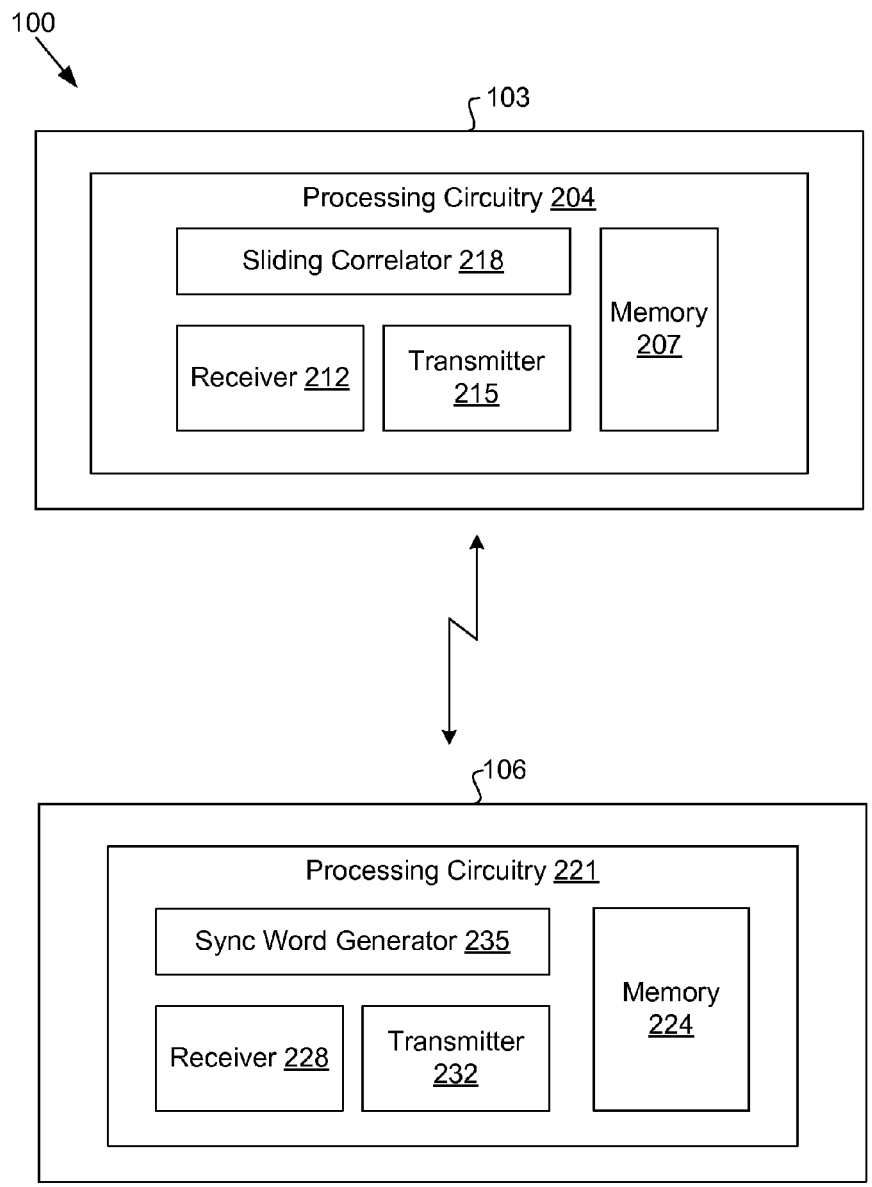
FIG. 2 is a drawing of components of the devices of the communication system of FIG. 1 according to various embodiments of the present disclosure.

With reference to FIG. 2, shown is a drawing of the components of the devices of the communication system 100 of FIG. 1, according to various embodiments of the present disclosure. FIG. 2 depicts a master device 103 that is operable to communicate with a slave device 106. The master device 103 comprises processing circuitry 204. The processing circuitry 204 may include various components such as, for example, a memory 207, a receiver 212, a transmitter 215, a sliding correlator 218, and/or other components. The processing circuitry 204 and/or its components may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry 204 may include one or more software modules executable by one or more processing circuits. For example, the processing circuitry 204 may include memory 207 configured to store instructions and/or code that causes the processing circuitry 204 to execute some or all of the functionality described herein.

The processing circuitry 204 may comprise a receiver 212 and a transmitter 215. The receiver 212 may be configured to receive wireless signals transmitted over a network. Wireless signals, for example, may express digitally formatted information that has been mixed and modulated by carrier signals to facilitate wireless communication. The receiver 212 is configured to convert received wireless signals into a digital format. For example, the receiver 212 may receive a data stream 107 (FIG. 1) and convert the received data stream 107 into the digital domain. The transmitter 215 may generate wireless signals for wireless transmission to other devices in the communication system 100. The transmitter 215 may also be operable to convert digital data into such wireless signals.

The sliding correlator 218 is operable to identify a sync word 109 (FIG. 1) that is received by the receiver 212. The sliding correlator 218 performs a sliding correlation operation that analyzes each of the bits in the received sync word 109 and compares each bit to the bits of an expected sync word. The sliding correlator 218 may bit shift the received sync word 109 and perform a subsequent correlation operation on the shifted received sync word and the expected sync word. The sliding correlator 218 may iteratively perform a correlation operation on each shifted version of the received sync word 109. The sliding correlator 218 correlates each bit of the received sync word 109 to an expected sync word according to a correlation threshold. The correlation threshold may be set to a value between zero and N, inclusively, where N is the number of bits of the sync word 109. If the correlation threshold is N, then all the bits of the received sync word 109 must correlate to the expected sync word to yield a result indicating that there is a match. As another example, if N=32 and the correlation threshold is set to 31, then 31 or 32 bits of the received sync word 109 must correlate to the expected sync word. Otherwise, the correlation operation yields a result indicating that there is no match.

The sliding correlator 218 is operable to receive and store the expected sync word in the memory 207. The expected sync word may be received from a previous communication between the master device 103 and the slave device 106.

Upon reconnect or re-synchronization, the correlation operation is performed to re-synchronize the slave device 106 to the master device 103.

FIG. 2 further depicts a slave device 106 that is operable to communicate with a master device 103. The slave device 106 comprises processing circuitry 221. The processing circuitry 221 may include various components such as, for example, a memory 224, a receiver 228, a transmitter 232, a sync word generator 235, and other components. The processing circuitry 221 and/or its components may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry 221 may include one or more software modules executable by one or more processing circuits. For example, the processing circuitry 221 may include memory 224 configured to store instructions and/or code that causes the processing circuitry 221 to execute data communication functions.

The processing circuitry 221 may comprise a receiver 228 and a transmitter 232. The receiver 228 may be configured to receive wireless signals transmitted over a network. Wireless signals, for example, may express digitally formatted information that has been mixed and modulated by carrier signals to facilitate wireless communication. The receiver 228 is configured to convert received wireless signals into a digital format. The transmitter 232 may generate wireless signals for wireless transmission to other devices in the communication system 100. The transmitter 232 may be operable to convert digital data into a wireless signal. For example, the transmitter 232 may transmit the data stream 107 to other devices in the communication system 100.

The sync word generator 235 is operable to generate a sync word 109 (FIG. 1) for a given device identifier, where the generated sync word is unique even under a cyclic shift. The device identifier may be, for example, a lower address part (LAP) of a media access control (MAC) address associated with the slave device 106 or components of the slave device 106. In this respect, the sync word generator 235 receives a device identifier as an input and maps the device identifier to a corresponding sync word 109 that is unique under cyclic shift. According to various embodiments, the sync word generator 235 converts a 24-bit device identifier into a 32-bit sync word 109. The processing circuitry 221 may insert one or more instances of the generated sync word 109 into the data stream 107 (FIG. 1) for transmission of the data stream by the transmitter 232.

Figure 3A:
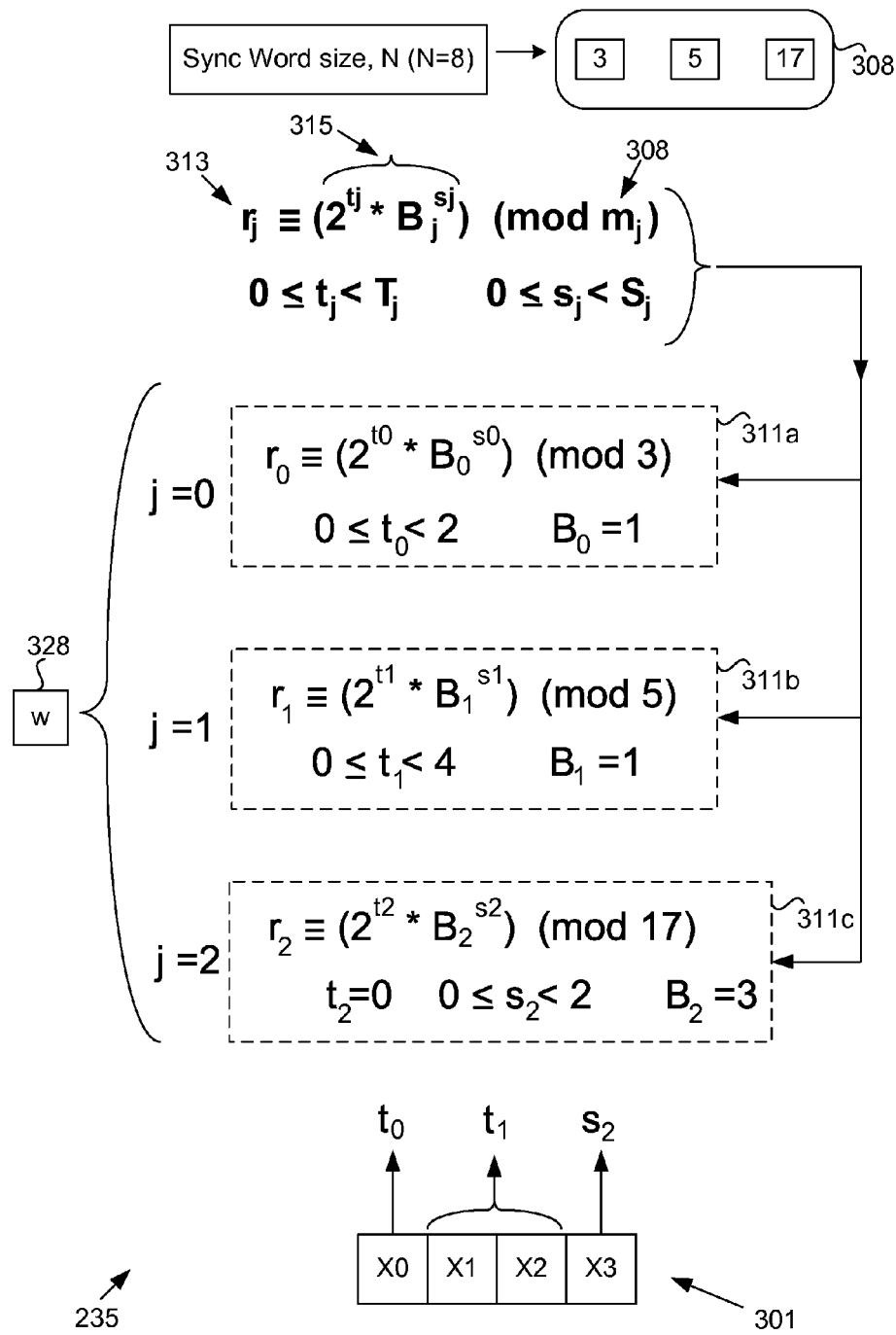
FIG. 3A is a drawing representing an example of the functionality of a sync word generator of a slave device of the communication system of FIG. 1 according to various embodiments of the present disclosure.

FIG. 3A provides a representation of an example of the functionality of the sync word generator 235 of a slave device 106 (FIG. 1) of the communication system 100 of FIG. 1, according to various embodiments of the present disclosure. Specifically, FIG. 3A depicts the manner in which a sync word 109 (FIG. 1) may be generated by a sync word generator 235, where the sync word 109 is unique under cyclic shift.

Various embodiments of the present disclosure are directed to using Chinese Remainder Theorem (CRT) to generate a sync word 109 (FIG. 1) that reduces or eliminates the risk of a cyclic collision 115 (FIG. 1). The solution to a CRT problem is a value, w, that is common to a set of modulo expressions. Each modulo expression may yield a set of congruent solutions, and w is common among the sets of congruent solutions. Each modulo expression is dependent upon respective portions of the device identifier. The result, w, corresponds to a sync word 109 that is unique under cyclic shift and that is further bijectively mapped to the device identifier. This non-limiting example of FIG. 3A assumes that the sync word bit size, N, is equal to 8. Although N=8 in this example, various embodiments of the present disclosure allow N to be values other than 8.

The sync word generator 235 identifies a device identifier 301. In this non-limiting example, the device identifier is 4-bits using bits X0, X1, X2, and X3. The sync word generator 235 ultimately maps the 4-bit identifier to an 8-bit sync word 109 (FIG. 1) that is unique under cyclic shift.

To begin, a set of moduli 308 are ascertained. According to various embodiments, the set of moduli include all the prime factors of $2^N-1$. In this case, N=8 and $2^N-1=255$. Thus, the prime factors of 255 are 3, 5, and 17. The set of moduli 308 are organized in order of j, where the first modulus, 3, corresponds to j=0, the second modulus, 5, corresponds to j=1, and the third modulus, 17, corresponds to j=2.

Next, a set of modulo expressions 311 are determined. A class of remainders 313 may be solved for a modulo expression 311, where the class of remainders 313 is referred to as $r_j$. In this respect, $r_j$ is the residue over jth prime factor of $2^N-1$. A modulo expression 311 further includes a modulus 308. The modulus 308 for each modulo expression 311 is determined from the set of moduli 308. A modulus may be referred to as $m_j$. Each modulo in the set of moduli 308 corresponds to a respective modulo expression 311. To this end, a first modulo expression 311a uses a modulo of 3, a second modulo expression 311b uses a modulo of 5, and a third modulo expression 311c uses a modulo of 17.

Moreover, a modulo expression 311 further includes a dividend 315. The dividend 315 is the product of a first prime number, such as 2, raised to the power of $t_j$ and a second prime number, $B_j$, raised to the power of $s_j$. The first prime number and the second prime number, are dependent on j. The exponents $t_j$ and $s_j$ are based on portions of the device identifier 301. Accordingly, the sync word generator 235 may allocate respective portions of the device identifier 301 to determine values of the exponents $t_j$ and $s_j$ in order to calculate the values of the dividends 315.

After determining the variables of the modulo expressions 311, the classes of remainders 313 are determined. The lowest common remainder 328 among the classes of remainders 313 is determined, where the lowest common remainder may be referred to as w. If w is greater than $2^N-1$, then w (mod $(2^N-1)$) may be performed to ensure that w is less than $2^N-1$.

The value w represents a sync word 109 (FIG. 1) that is generated according to the device identifier 301 and that is unique under cyclic shift. In this respect, the sync word generator 235 bijectively maps the device identifier 301 to the value w to reduce or eliminate the risk of a cyclic collision. The value w represents the lowest common remainder 328 determined from the class of remainders 313. Each remainder among the class of remainders 308 is determined using the corresponding modulo expression 311.

According to various embodiments, the equation for w is as follows:

$$w = \left\langle \sum_{j=0}^{R-1} r_j \frac{M}{m_j} \left( \left( \frac{M}{m_j} \right)^{-1} \right)_{m_j} \right\rangle_M$$

$$M = 2^N - 1$$

Using the equation above, in the case where N=8, the equation for w is as follows:

$$w = \langle 85 \ast r_0 + 51 \ast r_1 + 120 \ast r_2 \rangle_{255}$$

As noted above, M=255, where M=$2^N$−1 and where the various $m_j$ values include the moduli 308 of 3, 5, and 17. Thus, w is function of the various remainders, $r_0$, $r_1$, and $r_2$.

Additionally, the equation for w may be reduced to the following equation in the case where N=32:

$$w = \genfrac{(}{)}{}{}{1431655765*r_0+3435973836*r_1+\\505290270*r_2+106956384*r_3+214745088*r_4}{4294967295}$$

The value M=$2^N$−1 such that M=4294967295. The various $m_j$ values include the moduli 308 of 3, 5, and 17, 257, and 65537.

To determine the various r values, the sync word generator 235 may employ various schemes to allocate portions of the device identifier 301 to the modulo expressions 311. For example, the first modulo expression 311a is based on j=0. According to the first modulo expression 311a, $0 \leq t_o < 2$ where $T_j$=2. That is to say, $t_o$ is either 1 or 0 (i.e., a 1-bit number) and the sync word generator 235 may be operable to allocate the first bit, X0, of the device identifier 301 to the exponent $t_o$. The sync word generator 235 may allocate disjointed or non-overlapping portions of the device identifier 301 to determine the exponents of the various dividends 315. Put another way, the $T_j$ and $S_j$ values provide an upper bound of a range of values of the exponents for a given dividend 315. When j=0 and/or when j=1, the corresponding $S_j$ may be set to zero. According to various embodiments, the $T_j$ and $S_j$ are dependent only on j. The number of j values depends on the number of prime factors of M.

According to various embodiments, the $t_j$ value for the largest j is set to equal zero. In the non-limiting example of FIG. 3A, the largest j is equal to 2, thus, $t_2$ is set to equal zero. But setting the $t_j$ value for the largest j to equal zero, the remainder 313, $r_j$, for the largest j ensures that the lowest common remainder 328, w, yields a result that is unique under cyclic shift.

FIG. 3B is a drawing representing an example of the functionality of a sync word generator 235 (FIG. 2) of a slave device 106 (FIG. 1) of the communication system 100 of FIG. 1, according to various embodiments of the present disclosure. Specifically, FIG. 3B depicts the various cases of setting the one or more of the dividends 315 (FIG. 3A) among the set of modulo expressions 311 (FIG. 3A) to zero. Setting one or more of the dividends 315 to zero results in a different case. The sync word generator 235 may use any number of preselected cases to generate a sync word 109 (FIG. 1).

Case 1, as depicted in FIG. 3B, sets all of the dividends 315 (FIG. 3A) to zero, while case 8 sets none of the dividends 315 to zero. Assuming that N=8, case 8 may yield the largest number of unique sync words 109 (FIG. 1) among the other cases.

Although FIGS. 3A and 3B assume N=8, various embodiments are not so limited. In some embodiments, N=32, thereby setting the sync word bit size to 32. The following is an example of a sync word generator 235 (FIG. 2) operable to generate a 32-bit sync word 109 (FIG. 1) based on a 24-bit device identifier 301 (FIG. 3A).

If N=32, the set of moduli 308 (FIG. 3A) include the values 3, 5, 17, 257, and 65537, which are the prime factors of $2^N$−1=4294967295. Five different modulo expressions 311 (FIG. 3A) may be used, where j ranges from zero to four. The following is a list of the five modulo expressions 311 used to determine w.

$r_0 \equiv 2^{t0}$ (mod 3), where j=0
$r_1 \equiv 2^{t1}$ (mod 5), where j=1
$r_2 \equiv 2^{t2}*B^{s2}$ (mod 17), where j=2
$r_3 \equiv 2^{t3}*B^{s3}$ (mod 257), where j=3
$r_3 \equiv 2^{t4}*B^{s4}$ (mod 65537), where j=4

According to various embodiments, the first prime number of the dividend 315 (FIG. 3A) is set to the value of 2 and the second prime number of the dividend 315 is set to the value of B=3. In some embodiments, none of the dividends 315 are set to zero, which is similar to Case 8 shown in FIG. 3B. To achieve a bijective mapping from a 24-bit device identifier 301 (FIG. 3A) to a 32-bit sync word 109 (FIG. 1). The value $t_0$ is based on 1 bit of the device identifier 301, $t_1$ is based on 2 bits of the device identifier 301, $t_2$ is based on 3 bits of the device identifier 301, $s_2$ is based on 1 bit of the device identifier 301, $t_3$ is based on 4 bits of the device identifier 301, $s_3$ is based on 4 bits of the device identifier 301, and $s_4$ is based on 9 bits of the device identifier 301. Moreover, the value $t_4$ may be set to zero to ensure that the solution yields a result that is unique under cyclic shift. The value $t_4$ may be set to zero because $t_4$ is the t value associated with the largest j value. In this non-limiting example, the largest j value is equal to 4.

The allocation of bits of the device identifier 301 (FIG. 3A) to the dividend exponents t and s may occur in any suitable manner. Non-overlapping portions of the device identifier 301 may be used to determine these values.

According to some embodiments, the sync word generator 235 generates the sync word 109 (FIG. 1) that meets a condition. The condition may be, for example, a specification that the sync word 109 is to include an odd number of 1's. Another condition may be, for example, a specification that that the sync word 109 is to include an even number of 1's. By using one or more conditions to generate the sync word 109, the sync word generator 235 has an additional mechanism to reduce the risk of a cyclic collision.

In some embodiments, the sync word generator 235 (FIG. 2) may iteratively generate sync words 109 (FIG. 1) until a condition is met. In this case, the sync word generator 235 may continue to determine a sync word 109 within a predetermined number of iterations, otherwise the sync word generator 235 times out and generates a sync word 109 that does not satisfy the condition. For example, generating a sync word 109 that meets a condition may take too much time or may be impossible given the value of the device identifier 301 (FIG. 3A). Using a predetermined number of iterations limits the amount of time or resources the sync word generator 235 uses to generate a sync word 109. Furthermore, the correlation threshold may be set to a value that is less than N.

For example, if the predetermined number of iterations is four, then the sync word generator 235 (FIG. 2) is give only four attempts to generate a sync word 109 that satisfies the condition. The first iteration of sync word generation may be similar to Case 8, shown in FIG. 3B, where none of the dividends 315 (FIG. 3A) are set to zero. If the generated sync word 109 does not satisfy the condition, then the second iteration of sync word generation may set one or more of the dividends 315 to zero. If the generated sync word 109 still does not satisfy the condition, then the third iteration of sync word generation may set one or more other dividends 315 to zero. The sync word generator 235 may continue to attempt to generate a sync word 109 that satisfies the condition until the condition is satisfied or until the predetermined number of iterations is reached.

Figure 4:
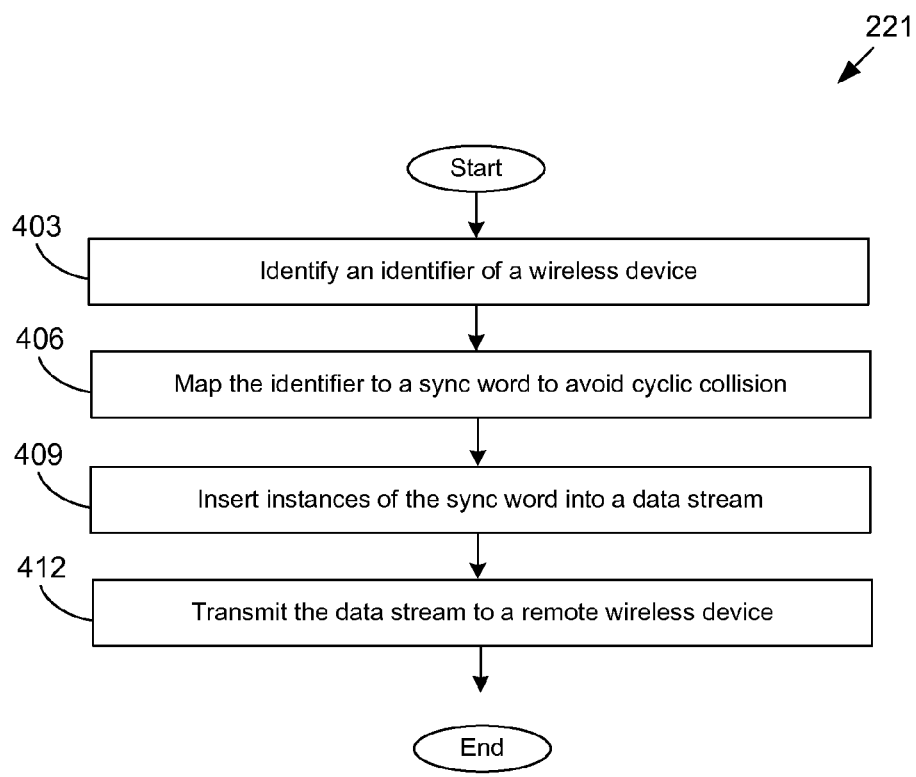
FIG. 4 is a flowchart illustrating one example of functionality implemented as portions of the processing circuitry of a slave device of the communication system of FIG. 1 according to various embodiments of the present disclosure.

Turning now to FIG. 4, shown is a flowchart that provides an example of operation of a portion of the logic executed by the processing circuitry 221 of a slave device 106 of FIG. 1, according to various embodiments. It is understood that the flowchart of FIG. 4 provides merely an example of the many different types of functional arrangements that may be employed to implement the operation of the portion of the logic executed by the processing circuitry 221 as described herein. As an alternative, the flowchart of FIG. 4 may be viewed as depicting an example of steps of a method implemented in the processing circuitry 221 according to one or more embodiments.

Beginning at 403, the processing circuitry 221 (FIG. 2) identifies an identifier of a wireless device. The identifier may be a device identifier 301 (FIG. 3A) of a slave device 106 (FIG. 1). For example, the device identifier 301 may be based on at least a portion of a media access control (MAC) address of the slave device 106. According to various embodiments, a 24-bit device identifier 301 is identified by the sync word generator 235 (FIG. 2).

At 406, the processing circuitry 221 (FIG. 2) maps the identifier to a sync word 109 (FIG. 1) to avoid cyclic collision. For example, a sync word generator 235 (FIG. 2) generates a sync word 109 based on the device identifier 301 (FIG. 3A) such that there is a bijective mapping between the device identifier 301 and the sync word 109. Moreover, the generated sync word 109 may be unique under cyclic shift. For example, if a particular device identifier 301 is mapped to a sync word of "0101," then no other device identifier 301 may be mapped to cyclically shifted versions of "0101." That is to say, no other device identifier 301 may be mapped to the sync word "1010," which is the only cyclically shifted version of "0101."

According to various embodiments, the sync word generator 235 (FIG. 2) uses CRT to generate the sync word 109 (FIG. 1). For example, the sync word generator 235 may determine an exponent of a prime number according to a portion of the device identifier 301 (FIG. 3A). The exponent and the prime number may be used to determine the dividend 315 (FIG. 3A) of a modulo expression 311 (FIG. 3A) among a set of modulo expressions 311. The sync word generator 235 may use non-overlapping portions of the device identifier 301 to determine respective exponents of the various modulo expressions 311. These exponents may correspond to the t and s values of FIG. 3A.

In some embodiments, one or more dividends 315 (FIG. 3A) of the modulo expressions 311 (FIG. 3A) may be set to zero. By setting the dividend 315 to zero, the number of possible sync words 109 (FIG. 1) increases.

When generating the sync word 109 (FIG. 1), the sync word generator 235 (FIG. 2) may iteratively attempt to generate a sync word 109 that satisfies a condition until that condition is met or until a predetermined number of iterations is reached. A condition may relate to whether the number of 1's or 0's in the sync word 109 is even or odd.

At 409, the processing circuitry 221 (FIG. 2) inserts instances of the sync word 109 (FIG. 1) in a data stream 107 (FIG. 1). For example, the sync word 109 may occupy two or more fields in a data packet to allow for multiple instances of the sync word 109 to be transmitted. At 412, the processing circuitry 221 (FIG. 2) transmits the data stream 107 to a remote wireless device. The transmitter 232 (FIG. 2) of the processing circuitry 221 may transmit the data stream 107 to a remote wireless device that is a master device 103 (FIG. 1). The transmission of this data stream 107 may be part of a re-synchronization process where a slave device 106 (FIG. 1) is attempting to reconnect or reattach to a wireless network. The master device 103 may include a receiver 212 (FIG. 2) that receives the data stream 107 and identifies the sync word 109 embedded in the data stream 107. Moreover, the master device 103 may include a sliding correlator 218 (FIG. 2) to correlate the received sync word 109 with an expected or previously received sync word 109.

The flowchart of FIG. 4 shows the functionality and operation of an implementation of portions of the processing circuitry 221 (FIG. 2) implemented in a slave device 106 (FIG. 1). Portions of the flowchart of FIG. 4 may be embodied as software. For example, software may be used to simulate the various components discussed above with respect to at least FIG. 4. If embodied in software, each reference number, represented as a block, may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code. If embodied in hardware, each block may represent a circuit or a number of interconnected circuits to implement the specified logical function(s).

Although the flowchart of FIG. 4 depicts a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, providing troubleshooting aids, etc. It is understood that all such variations are within the scope of the present disclosure.

Also, any logic or application described herein, including the processing circuitry 221 (FIG. 2), that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. For example, the memory 207 (FIG. 2) of the master device 103 (FIG. 1) and the memory 224 (FIG. 2) of the slave device 106 (FIG. 1) may include computer-readable medium.

The computer-readable medium can comprise any one of many physical media such as, for example, magnetic, optical, or semiconductor media. More specific examples of a suitable computer-readable medium include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It is emphasized that the above-described embodiments of the present disclosure are merely possible examples of implementations set forth for a clear understanding of the principles of the disclosure. Many variations and modifications may be made to the above-described embodiment(s) without Therefore, at least the following is claimed:

1. A method, comprising:
   generating a sync word according to an identifier associated with a transmitter, the sync word being unique under a cyclic shift of the sync word;
   inserting a plurality of instances of the sync word into a data packet; and
   transmitting the data packet to a receiver, the receiver being operable to perform a sliding correlation operation to facilitate communication with the transmitter via a communication protocol.

2. The method of claim 1, wherein generating the sync word comprises bijectively mapping the identifier to the sync word to avoid cyclic collision.

3. The method of claim 1, wherein generating the sync word comprises generating the sync word according to a condition, the condition specifying that the sync word is to comprise an odd number of 1's or an even number of 1's.

4. The method of claim 1, wherein generating the sync word comprises generating the sync word according to the Chinese Remainder Theorem.

5. The method of claim 1, wherein generating the sync word comprises generating the sync word according to a modulo expression based on the Chinese Remainder Theorem, wherein the modulo expression is defined as follows:

$$r = (2^t * B^s) \bmod(m)$$

wherein r comprises a class of remainders, wherein t is based on a portion of the identifier, wherein B is a prime number greater than 2, wherein s is based on another portion of the identifier, wherein m is a modulus that is one of a plurality of prime factors of M, wherein M is based on a size of the sync word.

6. The method of claim 4, wherein the sync word is N bits, wherein generating the sync word comprises generating the sync word according to a set of moduli, the set of moduli comprising all the prime factors of $2^N-1$.

7. The method of claim 6, wherein the sync word is determined according to a common remainder among a plurality of modulo expressions using the set of moduli.

8. The method of claim 7, wherein a modulo expression among the plurality of modulo expressions comprises a dividend, the dividend being determined according to raising a prime number to the power of an exponent, the exponent being determined according to a portion of the identifier.

9. A system comprising:
   a wireless communication device operable to:
      bijectively map a device identifier to a sync word, the sync word being unique under a cyclic shift of the sync word, the sync word comprising N bits; and
      transmit, via a transmitter, a first instance of the sync word and a second instance of the sync word to a receiver; and
      wherein the receiver is operable to perform a sliding correlation operation on at least one of the first instance of the sync word or the second instance of the sync word to facilitate communication with the transmitter via a communication protocol.

10. The system of claim 9, wherein the device identifier is based on a lower address part (LAP) of a media access control (MAC) address associated with the transmitter.

11. The system of claim 9, wherein the wireless communication device is operable to generate the sync word according to the Chinese Remainder Theorem.

12. The system of claim 9, wherein the wireless communication device is operable to bijectively map the device identifier to a plurality of sync words until a condition is met for generating the sync word within a predetermined number of iterations.

13. The system of claim 11, wherein the wireless communication device is operable to generate the sync word by identifying a remainder that is common to a plurality of modulo expressions.

14. The system of claim 13, wherein each modulo expression comprises a respective dividend and a respective modulus that is one of a plurality of prime factors of M, wherein M is equal to $2^N-1$.

15. A wireless communication device comprising:
   a transmitter; and
   processing circuitry, the processing circuitry comprising:
      circuitry that generates a sync word according to an identifier of the wireless communication device, the sync word being unique under a cyclic shift of the sync word;
      circuitry that inserts a plurality of instances of the sync word into a data stream;
      circuitry that transmits, via the transmitter, the data stream to a receiver, the receiver being operable to perform a sliding correlation operation on the sync word.

16. The wireless communication device of claim 15, wherein the sync word is generated according to the Chinese Remainder Theorem by identifying a remainder that is common to a plurality of modulo expressions.

17. The wireless communication device of claim 15, further comprising circuitry that generates a 32 bit sync word according to a 24 bit identifier.

18. The wireless communication device of claim 16, further comprising:
   circuitry that divides the identifier into a plurality of non-overlapping portions, the plurality of non-overlapping portions comprising a first portion; and
   circuitry that determines a first exponent of a first prime number according to the first portion, the first exponent and the first prime number being used to determine a dividend of a modulo expression among the plurality of modulo expressions.

19. The wireless communication device of claim 16, wherein a set of moduli are used as moduli for the plurality of modulo expressions, wherein the set of moduli comprise the values of 3, 5, 17, 257, and 65537.

20. The wireless communication device of claim 18, wherein the plurality of non-overlapping portions comprises a second portion;
   the wireless communication device further comprising circuitry that sets the second portion as a second exponent of a second prime number, the second exponent and the second prime number being further used to determine the dividend of the modulo expression.

* * * * *